US012162274B2

(12) United States Patent
Kobayashi

(10) Patent No.: US 12,162,274 B2
(45) Date of Patent: Dec. 10, 2024

(54) ROLL PAPER PRINTER

(71) Applicant: SEIKO EPSON CORPORATION, Tokyo (JP)

(72) Inventor: Takehiro Kobayashi, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 133 days.

(21) Appl. No.: 18/163,449

(22) Filed: Feb. 2, 2023

(65) Prior Publication Data

US 2023/0241907 A1 Aug. 3, 2023

(30) Foreign Application Priority Data

Feb. 3, 2022 (JP) ................................ 2022-015485

(51) Int. Cl.
*B41J 15/04* (2006.01)

(52) U.S. Cl.
CPC .................................. *B41J 15/046* (2013.01)

(58) Field of Classification Search
CPC ......... B41J 11/42; B41J 15/042; B41J 15/046
See application file for complete search history.

(56) References Cited

U.S. PATENT DOCUMENTS

2006/0180989 A1* 8/2006 Seike ........................ B65H 3/66 271/121

FOREIGN PATENT DOCUMENTS

JP 2009113899 * 5/2009 ............. B65H 23/06
JP 2020-019609 A 2/2020

* cited by examiner

*Primary Examiner* — Anh T Vo
(74) *Attorney, Agent, or Firm* — Harness, Dickey & Pierce, P.L.C.

(57) ABSTRACT

A roll paper printer includes: a case configured to accommodate a paper roll in which paper is wound in such a way that one surface of the paper faces outward; a transport roller that pulls the paper from the paper roll and transports the paper in a transport direction; a first paper guide configured to come into contact with the other surface of the paper upstream of the transport roller in the transport direction; a second paper guide that faces the first paper guide and is configured to come into contact with the one surface of the paper; a third paper guide configured to be attached/detached and configured to come into contact with the one surface of the paper and curve the paper upstream of the second paper guide in the transport direction; a sensor configured to detect the third paper guide; and a controller that decreases, when the third paper guide is detected by the sensor, a transport speed for the paper transported by the transport roller to be lower than that when the third paper guide is not detected.

6 Claims, 3 Drawing Sheets

ROLL PAPER PRINTER

The present application is based on, and claims priority from JP Application Serial Number 2022-015485, filed Feb. 3, 2022, the disclosure of which is hereby incorporated by reference herein in its entirety.

BACKGROUND

1. Technical Field

The present disclosure relates to a roll paper printer.

2. Related Art

Hitherto, there has been known a device for printing on paper as disclosed in JP A-2020-19609, the device being configured to correct curling of paper pulled from a paper roll.

In the above-described device, it is not possible to achieve an appropriate transport speed for a transport load when also correcting curling of paper.

SUMMARY

A roll paper printer includes: a case configured to accommodate a paper roll in which paper is wound in such a way that one surface of the paper faces outward; a transport roller that pulls the paper from the paper roll and transports the paper in a transport direction; a first paper guide configured to come into contact with the other surface of the paper upstream of the transport roller in the transport direction; a second paper guide that faces the first paper guide and is configured to come into contact with the one surface of the paper; a third paper guide configured to be attached/detached and configured to come into contact with the one surface of the paper and curve the paper upstream of the second paper guide in the transport direction; a sensor configured to detect the third paper guide; and a controller that decreases, when the third paper guide is detected by the sensor, a transport speed for the paper transported by the transport roller to be lower than that when the third paper guide is not detected.

DESCRIPTION OF EXEMPLARY EMBODIMENTS

1. First Embodiment

1-1. Configuration of Roll Paper Printer

Figure 1:
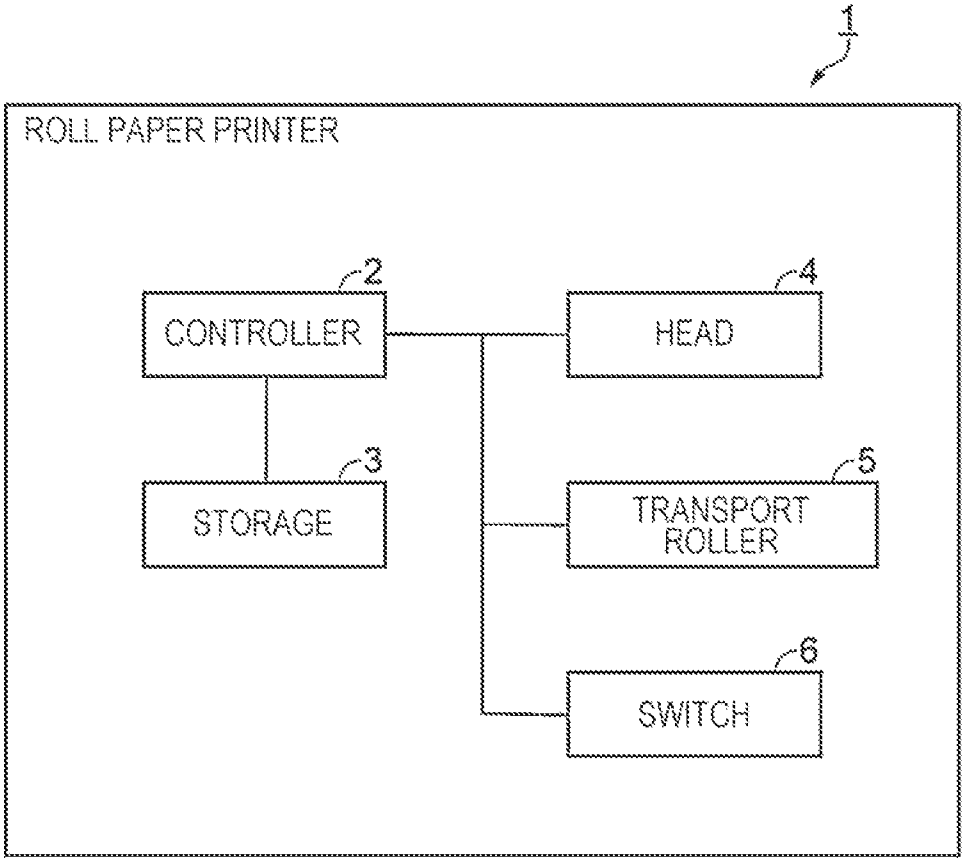
FIG. 1 is a block diagram of a roll paper printer.

A roll paper printer 1 according to an embodiment will be described below with reference to FIGS. 1 to 3. Directions in the drawings will be described using a three-dimensional coordinate system. For convenience of explanation, a positive direction of a Z-axis is referred to as an upward direction or simply upward, a negative direction of the Z-axis is referred to as a downward direction or simply downward, a positive direction of an X-axis is referred to as a right direction or simply right, a negative direction of the X-axis is referred to as a left direction or simply left, a positive direction of a Y-axis is referred to as a front direction or simply front, and a negative direction of the Y-axis is referred to as a rear direction or simply rear.

The roll paper printer 1 according to the embodiment is used, for example, in a point of sale (POS) system. The POS system is a system used for businesses such as retail businesses, for example, shopping centers, department stores, convenience stores, and on-board catering, and food businesses, for example, restaurants, cafes, and pubs. The roll paper printer 1 used in the POS system prints receipts, coupons, tickets, and the like according to products and services.

As illustrated in FIG. 1, the roll paper printer 1 includes a controller 2, a storage 3, a head 4, a transport roller 5, and a switch 6 that is a sensor.

When the roll paper printer 1 includes a battery (not illustrated), the roll paper printer 1 can be carried and used by a staff member of a store.

The controller 2 includes a central processing unit (CPU) that comprehensively controls each section of the roll paper printer 1, a universal asynchronous receiver transmitter (UART) that manages input and output, a field programmable gate array (FPGA) and a programmable logic device (PLD) that are logic circuit, and the like. The CPU is also referred to as a processor. The storage 3 includes a flash read-only memory (ROM), a hard disk drive (HDD), a random access memory (RAM), and the like, the ROM and the HDD being rewritable nonvolatile memories, and the RAM being a volatile memory.

The CPU of the controller 2 reads a program such as firmware stored in the nonvolatile memory of the storage 3 and executes the program by using the RAM of the storage 3 as a work area.

In addition, the storage 3 stores setting information used when the controller 2 performs control. The setting information includes information regarding a transport speed of the transport roller 5, an energization time of the head 4, and the like. The controller 2 can change the transport speed of the transport roller 5 based on a detection result of the switch 6 as described later.

The roll paper printer 1 in which a third paper guide 18 is not provided will be described in detail with reference to FIG. 2.

Figure 2:
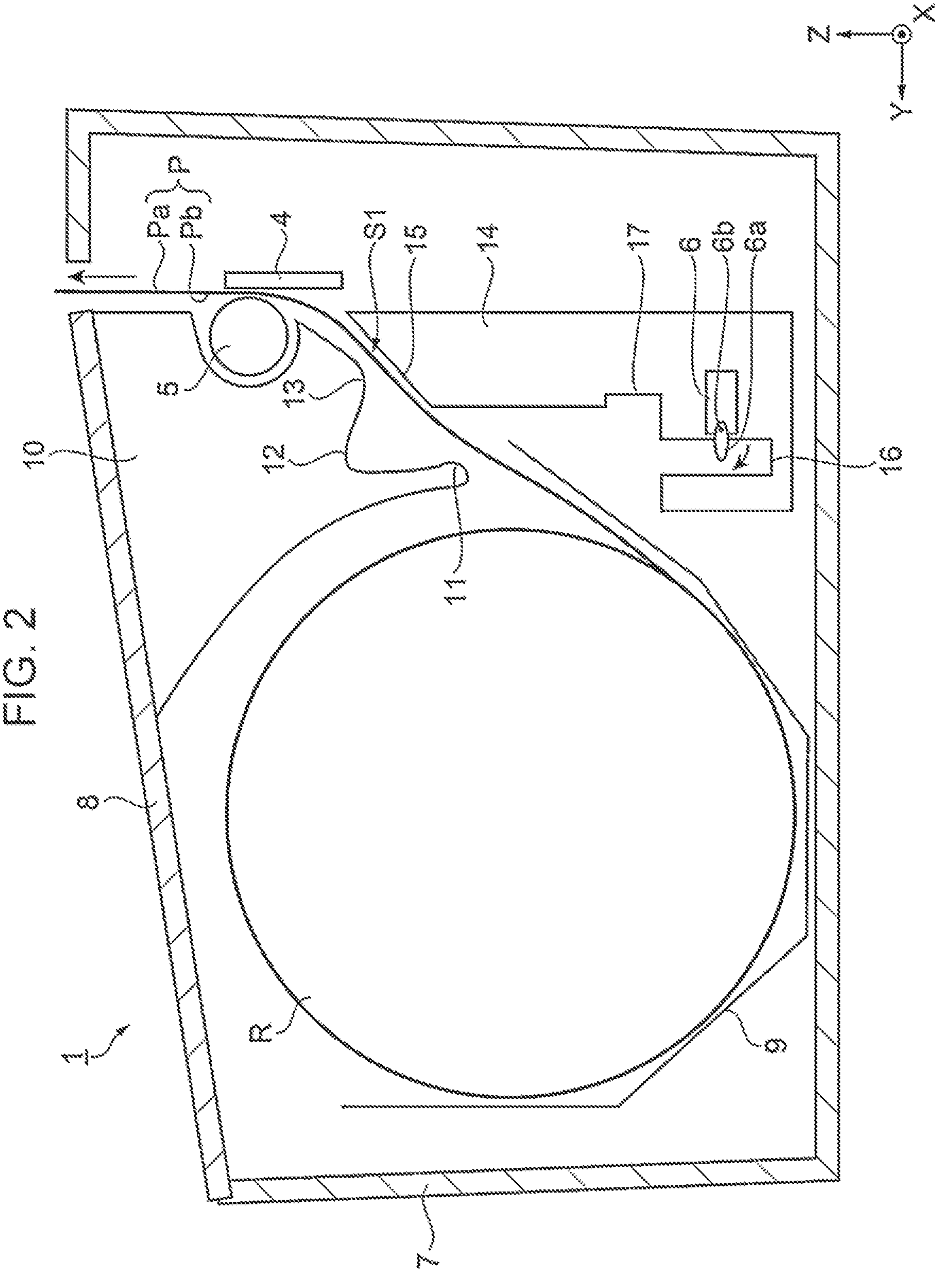
FIG. 2 is a schematic sectional diagram of the roll paper printer in a state where a third paper guide is removed.

As illustrated in FIG. 2, the roll paper printer 1 includes a case 7, a cover 8, a container 9, a first paper guide 10, and a second paper guide 14 in addition to the head 4, the transport roller 5, and the switch 6.

A hinge (not illustrated) is provided at an upper-front position on the case 7. The cover 8 is mounted on the case 7 in such a way as to be pivotable about the hinge.

The case 7 is provided with the head 4, the switch 6, the container 9, and the second paper guide 14. The switch 6 is fixed to the case 7 via the second paper guide 14. Meanwhile, the cover 8 is provided with the transport roller 5 and the first paper guide 10.

In the roll paper printer 1, the case 7 can be provided with one of the head 4 and the transport roller 5, and the cover 8 can be provided with the other of the head 4 and the transport roller 5.

Paper P is, for example, elongated thermal paper. The paper P has a front surface Pa, which is one surface of the paper P, coated with a heat-sensitive material, and an image can be printed on the paper P by the head 4 that is a line thermal head. A back surface Pb, which is the other surface of the paper P, is the surface that comes into contact with the transport roller 5.

Based on the setting information in the storage 3, the controller 2 can rotate the transport roller 5 to transport the paper P in a transport direction indicated by an arrow and energize the head 4 to print an image.

The printed paper P is cut by a cutter (not illustrated) positioned downstream of the head 4 and the transport roller 5 in the transport direction, and handed by a staff member to a customer as a receipt or the like.

A paper roll R is wound around a core in such a way that the front surface Pa of the paper P faces outward and the back surface Pb faces inward. A portion of the paper P that is closer to the core of the paper roll R, that is, a portion of the paper P that is wound around a portion of the paper roll R where an outer diameter is smaller has a stronger curl. Further, the larger the thickness of the paper P, the stronger the curl.

A width of the paper P is 45 mm to 80 mm. The width of the paper P may be regulated by a partition plate. The thickness of the paper P is 0.040 mm to 0.065 mm. A diameter of the paper roll R is 50 mm to 80 mm. The diameter of the core is 12 mm to 18 mm. These values are only examples, and other values may be used.

The paper roll R can be accommodated in the container 9 arranged on a lower side in the case 7. The cover 8 can open/close the case 7. A staff member can access the container 9 by opening the cover 8 forward.

The staff member can set the paper P in the roll paper printer 1 by opening the cover 8, placing the paper roll R in the container 9, pulling the paper P from the paper roll R, and closing the cover 8.

When the cover 8 is closed, the transport roller 5 provided at the cover 8 is positioned to face the head 4 provided at the case 7 with the paper P interposed therebetween. As a result, the transport roller 5 comes into contact with the back surface Pb of the paper P, pulls out the paper P from the paper roll R in the container 9, and transports the paper P in the transport direction. Further, the head 4 comes into contact with the front surface Pa of the paper P and is able to perform printing.

The transport roller 5 positioned to face the head 4 with the paper P in between is also referred to as a platen roller.

When the cover 8 is closed, the first paper guide 10 provided at the cover 8 is positioned to face the second paper guide 14 provided at the case 7 with the paper P therebetween in a predetermined gap formed between the first paper guide 10 and the second paper guide 14 upstream of the transport roller 5 in the transport direction. The first paper guide 10 can come into contact with the back surface Pb of the paper P, and the second paper guide 14 can come into contact with the front surface Pa of the paper P.

As a result, a first paper path S1 for guiding the paper P is formed between the first paper guide 10 and the second paper guide 14 facing each other.

The first paper guide 10 and the second paper guide 14 extend in a lateral direction of the roll paper printer 1, which is a width direction of the paper P, and can guide the paper P across the width of the paper P.

The first paper guide 10 has a first surface 11, a second surface 12, and a third surface 13 having different shapes provided in order from upstream to downstream in the transport direction for the paper P.

Specifically, the first surface 11 has a projection shape that protrudes downward in a direction toward the paper P pulled from the paper roll R accommodated in the container 9. The first surface 11 can regulate an angle of the paper P directed from the container 9 toward the second surface 12.

Figure 3:
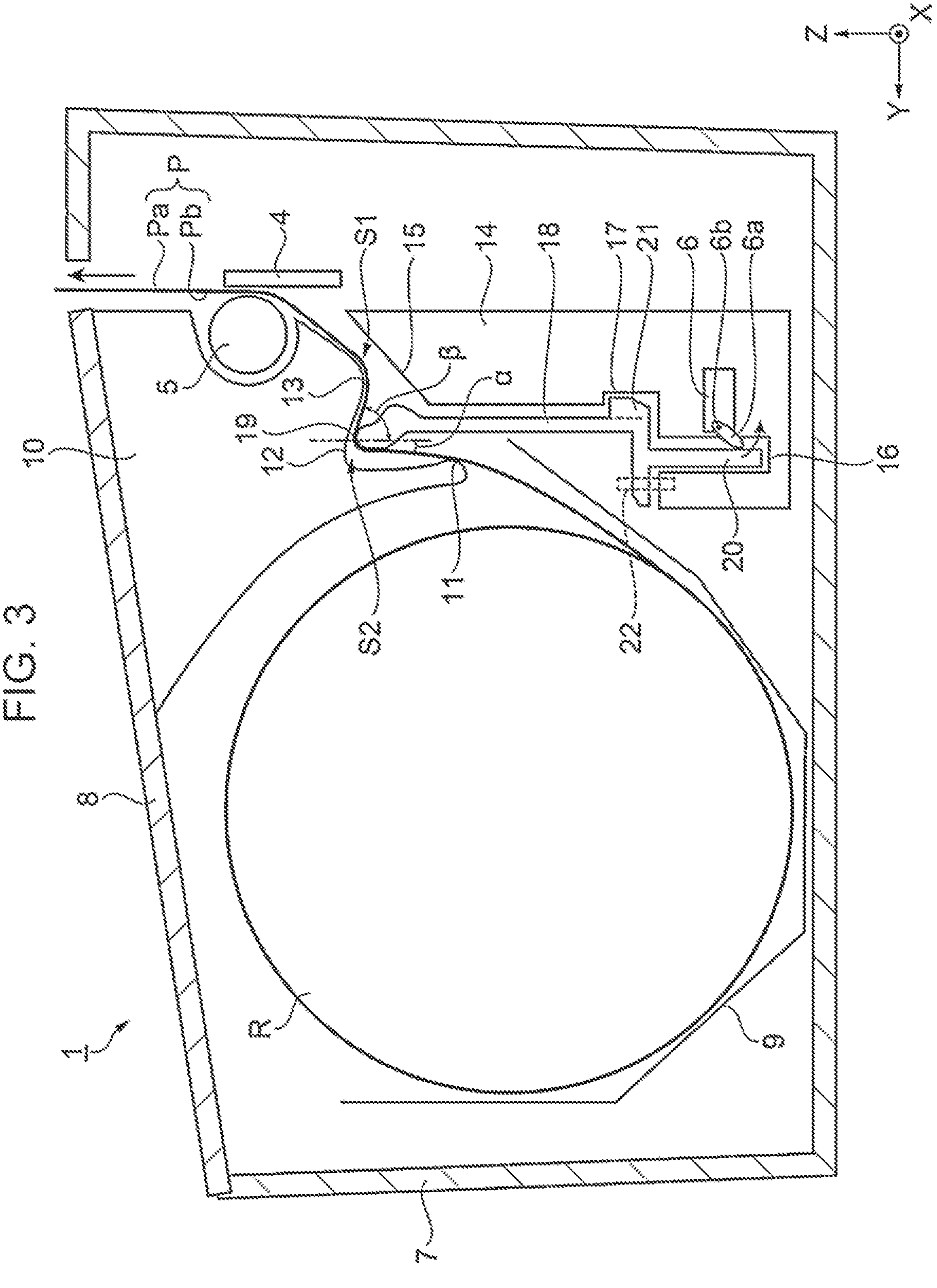
FIG. 3 is a schematic sectional diagram of the roll paper printer in a state where the third paper guide is attached.

The second surface 12 has a concave shape to face the protruding third paper guide 18 illustrated in FIG. 3. The third surface 13 has a convex shape to guide the paper P toward the head 4 and the transport roller 5 positioned above.

The second paper guide 14 has a fourth surface 15 having a slope shape so as to guide the paper P toward the head 4 and the transport roller 5 positioned above.

The fourth surface 15 of the second paper guide 14 faces the third surface 13 of the first paper guide 10 and forms the first paper path S1 together with the third surface 13.

The second paper guide 14 has a groove 16 for attaching the third paper guide 18 illustrated in FIG. 3 as will be described later and a notch-shaped latch 17 for forming a snap-fit connection. The groove 16 may be a hole or a notch.

Since the second paper guide 14 is fixed to the case 7, the third paper guide 18 can be fixed to the case 7 via the second paper guide 14 as illustrated in FIG. 3. The third paper guide 18 can be attached to and detached from the case 7 via the second paper guide 14.

At least one of the groove 16 or the latch 17 may directly be provided at the case 7. When the groove 16 is provided at the case 7, the third paper guide 18 can be attached to and detached from the case 7. In this instance, the switch 6 is also provided at the case 7.

Alternatively, at least one of the groove 16 or the latch 17 may be provided in a support (not illustrated) instead of in the second paper guide 14, and the support may be attached to the case 7. In this instance, the switch 6 is also provided on the support.

As described above, the groove 16 and the latch 17 can directly or indirectly be provided at the case 7.

A lever **6*a* of the switch 6 is rotatable around a shaft 6*b*. Two contacts formed of metal are provided inside the switch 6, the switch 6** is turned on when the two contacts come into contact with each other, and the switch is turned off when the two contacts are separated from each other.

FIG. 2 illustrates a state in which the third paper guide 18 illustrated in FIG. 3 is removed from the groove 16. The lever **6*a* of the switch 6 rotates clockwise and advances into the groove 16 of the second paper guide 14. In this state, the two contacts of the switch 6 are separated and the switch 6 is turned off. In this way, the switch 6 can transmit an OFF signal to the controller 2 when the third paper guide 18** is not detected.

On the other hand, as illustrated in FIG. 3, when the third paper guide 18 is inserted into the groove 16 and the lever **6*a* pushed by the third paper guide 18 rotates counterclockwise, the two contacts of the switch 6 come into contact with each other to establish an electrical connection, and the switch 6 is turned on. In this way, the switch 6 can transmit an ON signal to the controller 2 when the third paper guide 18** is detected.

The state in which the switch 6 is turned on and the state in which the switch 6 is turned off may be reversed.

In FIG. 2, the controller 2 acquires the OFF signal from the switch 6. The controller 2 can determine, based on the acquired OFF signal, that the third paper guide is not detected by the switch 6 and that the third paper guide is not attached to the roll paper printer 1.

The storage 3 stores, as the setting information, a transport speed corresponding to when the switch 6 is turned off, that is, a transport speed corresponding to when the third paper guide is not attached. The storage 3 stores, as the setting information, a transport speed corresponding to when the switch 6 is turned on, that is, a transport speed corresponding to when the third paper guide is attached.

The transport speed corresponding to when the switch 6 is turned off and the third paper guide is not attached is, for example, 100 mm/sec and is stored as the setting information in the storage 3.

The controller 2 reads, from the setting information in the storage 3, the transport speed corresponding to when the switch 6 is turned off. The controller 2 controls the transport roller 5 to transport the paper P at the read transport speed of 100 mm/sec.

The transport speed (100 mm/sec) corresponding to when the switch 6 is turned off is higher than the transport speed (65 mm/sec) corresponding to when the switch 6 is turned on and the third paper guide is detected. This is because a transport load for the paper P when the switch 6 is turned off and the third paper guide is not attached is smaller than that when the third paper guide is attached.

Next, the roll paper printer 1 to which the third paper guide 18 is attached will be described in detail with reference to FIG. 3.

As illustrated in FIG. 3, the third paper guide 18 mounted in the roll paper printer 1 has a fifth surface 19, a hook 21 for forming the snap-fit connection, and a protrusion 20.

A staff member mounts the third paper guide 18 on the second paper guide 14 by inserting the protrusion 20 of the third paper guide 18 into the groove 16 of the second paper guide 14. Meanwhile, the staff member removes the third paper guide 18 from the second paper guide 14 by removing the protrusion 20 of the third paper guide 18 from the groove 16 of the second paper guide 14. In this way, the third paper guide 18 can be attached to and detached from the second paper guide 14.

As described above, the second paper guide 14 is fixed to the case 7. The third paper guide 18 is mounted on the second paper guide 14 in the case 7.

When the groove 16 is provided at the case 7 instead of at the second paper guide 14, the third paper guide 18 can directly be mounted on the case 7. Further, when the groove 16 is provided in the support, the third paper guide 18 can be mounted on the support in the case 7.

In this way, the third paper guide 18 can directly or indirectly be mounted in the case 7.

The hook 21 of the third paper guide 18 forms the snap-fit connection together with the latch 17 of the second paper guide 14.

After inserting the protrusion 20 of the third paper guide 18 into the groove 16 of the second paper guide 14, the staff member fits the hook 21 of the third paper guide 18 into the latch 17 of the second paper guide 14. As a result, the third paper guide 18 is fixed to the second paper guide 14 by the snap-fit connection. The third paper guide 18 is fixed to the case 7 via the second paper guide 14 by the snap-fit connection.

Meanwhile, the staff member can also remove the hook 21 of the third paper guide 18 from the latch 17 of the second paper guide 14 to remove the third paper guide 18.

The staff member can also fix the third paper guide 18 to the second paper guide 14 by inserting a screw 22 into a screw hole provided in the second paper guide 14 and tightening the screw 22. The third paper guide 18 is fixed, with the screw 22, to the case 7 via the second paper guide 14. Meanwhile, the staff member can also remove the screw 22 to remove the third paper guide 18.

The third paper guide 18 may be fixed to the second paper guide 14 by at least one of the snap-fit connection formed by the hook 21 and the latch 17, or the screw 22.

When the latch 17 or the screw hole is provided at the case 7 instead of at the second paper guide 14, the third paper guide 18 can directly be fixed to the case 7 by the snap-fit connection or the screw. Alternatively, when the latch 17 or the screw hole is provided in the support, the third paper guide 18 can be fixed to the case 7 via the support.

In this way, the third paper guide 18 can directly or indirectly be fixed to the case 7.

As described above, a portion of the paper P that is closer to the core of the paper roll R and is wound around a portion of the paper roll R where the outer diameter is smaller tends to have a stronger curl. A receipt or the like printed on such paper P is curled inward in a form in which the paper P is wound, which degrades the quality of the printout. Further, the curled paper P may be caught downstream of the transport roller 5 and the head 4 in the transport direction.

As illustrated in FIG. 3, the third paper guide 18 has the fifth surface 19 that can come into contact with the paper P. The fifth surface 19 has a convex shape that protrudes toward the concave second surface 12 of the first paper guide 10.

The fifth surface 19 may have an arc shape. In this instance, the fifth surface 19 has, for example, an arc shape with a diameter of 2 mm. The diameter (2 mm) of the arch shape of the fifth surface 19 is smaller than ⅕ the diameter (12 mm to 18 mm) of the core of the paper roll R.

The fifth surface 19 of the third paper guide 18 and the second surface 12 of the first paper guide 10 face each other to form a second paper path S2 for the paper P. The second paper path S2 is curved at an acute angle in an opposite direction from a direction in which the transported paper P is curled in such a way that the second paper path S2 comes into contact with the paper P and corrects the curl of the paper P.

In this way, the paper P pulled from the paper roll R in the container 9 is transported from upstream to downstream in the transport direction, and the curl of the paper P is corrected along the second paper path S2 formed by the third paper guide 18 and the first paper guide 10 facing each other, and the paper P is then transported to the transport roller 5 and the head 4 via the first paper path S1 formed by the second paper guide 14 and the first paper guide 10 facing each other.

Meanwhile, the diameter of the paper roll R may change due to the use of the paper P, or the paper roll R may roll in the container 9 when a staff member is carrying the roll paper printer 1.

Even in such instances, the first surface 11 of the first paper guide 10 can come into contact with the paper P pulled from the paper roll R, and the angle of the paper P toward the second paper path S2 can be regulated to be kept constant.

After coming into contact with the first surface 11 of the first paper guide 10 and coming into contact with the fifth surface 19 of the third paper guide 18 in the second paper path S2, the paper P comes into contact with the third surface 13 of the first paper guide 10 in the first paper path S1.

As described above, specifically, the paper P pulled from the paper roll R accommodated in the container 9 can come into contact with the first surface 11 of the first paper guide 10, the fifth surface 19 of the third paper guide 18, and the third surface 13 of the first paper guide 10 from upstream to downstream in the transport direction.

More specifically, the paper P is transported from the first surface 11 of the first paper guide 10 to the fifth surface 19 of the third paper guide 18 at a first angle α and is then transported from the fifth surface 19 of the paper guide 18 to the third surface 13 of the first paper guide 10 at a second angle β. The first angle α and the second angle β are constant angles.

The paper P is stably transported at the first angle α and the second angle β upstream and downstream of the fifth surface 19 of the third paper guide 18. Further, the fifth surface 19 comes into contact with the paper P over a predetermined area.

At this time, with the fifth surface 19 of the third paper guide 18, the front surface Pa of the paper P transported by the transport roller 5 can be curved at a predetermined acute angle defined by the first angle α and the second angle β in the opposite direction from the direction in which the transported paper P is curled. Further, the fifth surface 19 of the third paper guide 18 can strongly rub the front surface Pa of the transported paper P over a predetermined area as if squeezing the paper P.

In this way, the fifth surface 19 of the third paper guide 18 can curve the paper P in the opposite direction from the direction in which the paper P is curled to stably come into contact with the paper P over the predetermined area at the predetermined angle defined by the first angle α and the second angle β. The third paper guide 18 can stably correct the curl of the paper P even when the diameter of the paper roll R changes or the paper roll R rolls in the container 9.

As illustrated in FIG. 3, the protrusion 20 of the third paper guide 18 is inserted into the groove 16 of the second paper guide 14. The lever **6*a* of the switch 6 comes into contact with the protrusion 20 of the third paper guide 18 and rotates counterclockwise. In this state, the two contacts of the switch 6 come into contact with each other to establish an electrical connection, such that the switch 6 is turned on. In this way, the switch 6 can transmit an ON signal to the controller 2 when the third paper guide 18** is detected.

The controller 2 acquires the ON signal from the switch 6. The controller 2 can determine, based on the acquired ON signal, that the third paper guide is detected by the switch 6 and that the third paper guide is attached to the roll paper printer 1.

For example, 65 mm/sec is the transport speed stored as the setting information in the storage 3 and corresponds to the transport speed when the switch 6 is turned on and the third paper guide is attached. The controller 2 reads the transport speed corresponding to when the switch 6 is turned on from the setting information in the storage 3. The controller 2 controls the transport roller 5 to transport the paper P at the read transport speed of 65 mm/sec.

As described above, the transport speed (65 mm/sec) corresponding to when the switch 6 is turned on is lower than the transport speed (100 mm/sec) corresponding to when the switch 6 is turned off.

When the switch 6 is turned on and the third paper guide is attached, the fifth surface 19 of the third paper guide strongly rubs the paper P as if squeezing the paper P while curving the transported paper P at an acute angle in the opposite direction from the direction in which the paper P is curled, and thus, the transport load for the paper P becomes larger than when the third paper guide is not attached. Torque for transporting the paper P with the transport roller 5 can be ensured for the large transport load due to the third paper guide by decreasing the transport speed of the transport roller 5.

On the other hand, as illustrated in FIG. 2, when the switch 6 is turned off and the third paper guide is not attached, the transport load for the paper P is smaller than when the third paper guide is attached. Therefore, the torque for transporting the paper P with the transport roller 5 can be ensured even when the transport speed of the transport roller 5 is increased.

For example, when using thick paper P having a thickness of 0.065 mm and a strong curl, a staff member mounts the third paper guide 18 on the second paper guide 14 and fixes, to the case 7, the third paper guide 18 with the snap-fit connection or the like to correct the curl.

The switch 6 detects the third paper guide 18 and transmits the ON signal to the controller 2. When the ON signal of the switch 6 is acquired, that is, when the third paper guide 18 is detected by the switch 6, the controller 2 sets the transport speed for the paper P transported by the transport roller 5 to 65 mm/sec, which is lower than the transport speed corresponding to when the third paper guide 18 is not detected.

As described above, when the third paper guide 18 is attached to the roll paper printer 1, the transport load for the paper P is large.

In this instance, the roll paper printer 1 can transport the paper P while correcting the curl by decreasing the transport speed of the transport roller 5.

On the other hand, for example, when using thin paper P having a thickness of 0.040 mm and a weak curl, a staff member determines that there is no need to correct the curl and removes the third paper guide 18 from the case 7.

The switch 6 transmits the OFF signal to the controller 2 because the third paper guide 18 is not detected. When the OFF signal of the switch 6 is acquired, that is, when the third paper guide 18 is not detected by the switch 6, the controller 2 sets the transport speed of the transport roller 5 to 100 mm/sec, which is higher than the transport speed corresponding to when the third paper guide 18 is detected.

As described above, when the third paper guide 18 is not attached to the roll paper printer 1, the transport load for the paper P is small.

In this instance, the roll paper printer 1 can increase the transport speed of the transport roller 5 to be higher than that when the third paper guide 18 is attached to transport the paper P, thereby increasing a printing speed. That is, the roll paper printer 1 can increase printing throughput.

As described above, the roll paper printer 1 according to the present embodiment includes the first paper guide 10, the second paper guide 14 facing the first paper guide 10, and the third paper guide 18 that can come into contact with the paper P and curve the paper P in the opposite direction from the direction in which the paper P is curled. The third paper guide 18 can be attached to and detached from the case 7 upstream of the second paper guide 14 in the transport direction.

When the third paper guide 18 is detected by the switch 6, the controller 2 can decrease the transport speed for the paper P transported by the transport roller 5 to be lower than that when the third paper guide 18 is not detected.

When the third paper guide 18 is attached to the roll paper printer 1, the transport load for the paper P increases. Therefore, the transport speed of the transport roller 5 can be decreased to transport the paper P while correcting the curl.

On the other hand, when the third paper guide 18 is not attached, the transport load for the paper P decreases. Therefore, the roll paper printer 1 can increase the transport speed of the transport roller 5, thereby increasing the printing throughput.

In this way, the roll paper printer 1 can set an appropriate transport speed for the transport load also when correcting the curl of the paper P.

As described above, the present embodiment has been described in detail with reference to the drawings, but the specific configuration is not limited to the embodiments, and modifications, substitutions, deletions, and the like may be made without departing from the gist of the disclosure.

Although a thermal head has been described above as an example of the head 4, any printing method may be used. For example, the head 4 may also be an ink jet head. In this instance, since the ink jet head cannot come into contact with the transport roller 5 to transport the paper P while having the paper P interposed therebetween, a driven roller that faces, with the paper P in between, the transport roller 5 and can transport the paper P may be mounted in the case 7.

Although a so-called mechanical switch including the lever 6*a* has been described above as an example of the switch 6 that is a sensor, other sensors may be used. For example, the switch 6 may be a reflective or transmissive optical sensor. Such an optical sensor can detect the third paper guide 18.

A surface of the paper P that comes into contact with the third paper guide 18 does not have to be a printing surface. The paper roll R is wound in such a way that the printing surface of the paper P faces inward. In this instance, the head 4 and the transport roller 5 are in reversed positions with respect to the positions illustrated in FIGS. 2 and 3.

What is claimed is:

1. A roll paper printer comprising:

a case configured to accommodate a paper roll in which paper is wound in such a way that one surface of the paper faces outward;

a transport roller that pulls the paper from the paper roll and transports the paper in a transport direction;

a first paper guide configured to come into contact with an other surface of the paper upstream of the transport roller in the transport direction;

a second paper guide that faces the first paper guide and is configured to come into contact with the one surface of the paper;

a third paper guide configured to be attached/detached and configured to come into contact with the one surface of the paper and curve the paper upstream of the second paper guide in the transport direction;

a sensor configured to detect the third paper guide; and a controller that decreases, when the third paper guide is detected by the sensor, a transport speed for the paper transported by the transport roller to be lower than a transport speed for the paper when the third paper guide is not detected.

2. The roll paper printer according to claim 1, further comprising:

a head that performs printing on the paper; and a cover that opens/closes the case, wherein the transport roller is provided at any one of the case and the cover, the head is provided at an other one of the case and the cover, the first paper guide is provided at the cover, the second paper guide is provided at the case, and the third paper guide is attached to and detached from the case.

3. The roll paper printer according to claim 1, wherein the first paper guide has a first surface, a second surface, and a third surface having different shapes provided in order from upstream in the transport direction, the second paper guide faces the third surface of the first paper guide to form a first paper path, the third paper guide faces the second surface of the first paper guide to form a curved second paper path, and the paper pulled from the paper roll comes into contact with the first surface of the first paper guide.

4. The roll paper printer according to claim 1, wherein the third paper guide has a protrusion, the case has a groove, and the third paper guide is configured to be mounted in the case by the protrusion being inserted into the groove.

5. The roll paper printer according to claim 1, wherein the third paper guide has a hook, the case has a latch, the hook and the latch form a snap-fit connection configured to be connected/disconnected, and the third paper guide is fixed to the case by the hook being fit into the latch of the case.

6. The roll paper printer according to claim 1, wherein the third paper guide is configured to be attached/detached and fixed to the case by a screw.

* * * * *